Oct. 23, 1951     L. A. MAJNERI     2,572,270
CONTROL MECHANISM FOR FLUID PRESSURE OPERATED SYSTEMS
Filed Jan. 2, 1945     3 Sheets-Sheet 1

INVENTOR.
LUDWIG A. MAJNERI
BY
Whittemore Hulbert & Belknap
ATTORNEYS

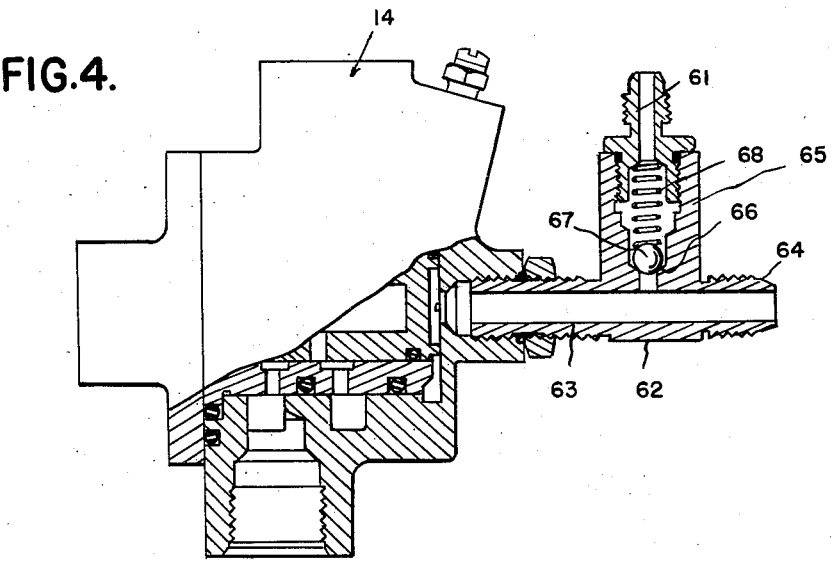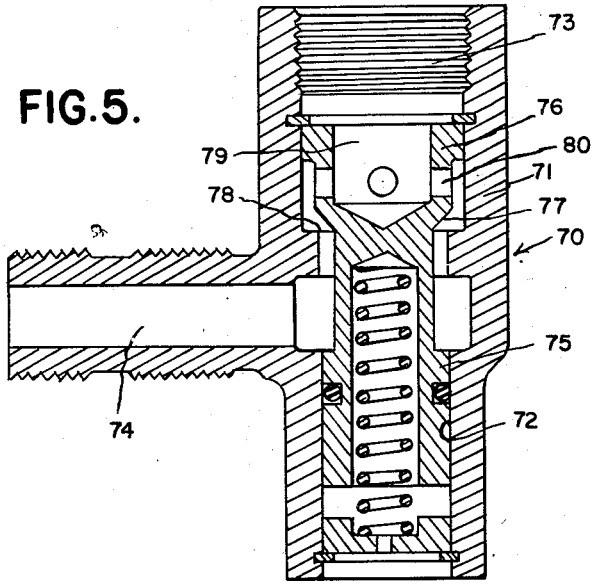

Patented Oct. 23, 1951

2,572,270

UNITED STATES PATENT OFFICE 2,572,270

CONTROL MECHANISM FOR FLUID PRESSURE OPERATED SYSTEMS

Ludwig A. Majneri, Grosse Pointe, Mich., assignor to The Warner Aircraft Corporation, Detroit, Mich., a corporation of Michigan Application January 2, 1945, Serial No. 571,052

8 Claims. (Cl. 121—38)

This invention relates to hydraulic braking systems and has as one of its objects to incorporate means in the system for maintaining the fluid pressure in the brake actuator below a predetermined maximum value regardless of the pressure exerted by the pressure producing device.

Another object of this invention is to provide a hydraulic braking system having a power valve operated by the pressure producing device to control the brake actuator and having a pressure limiting valve between the power valve and pressure producing device.

A further object of this invention is to provide a pressure limiting valve which is responsive to a pressure above a predetermined maximum value to close communication between the device and power valve.

Still another object of this invention is to provide a pressure limiting valve of the above type which maintains communication between the pressure producing device and power valve closed until the pressure in the power valve drops below a predetermined minimum value whereupon the pressure limiting valve opens to admit additional fluid to the power valve, even though the pressure at the producing device remains above the predetermined maximum pressure.

A still further object of this invention is to provide a pressure limiting valve which does not interfere with the normal operation of the power valves to regulate the fluid under pressure supplied to the brake actuator.

In addition to the above the present invention contemplates a hydraulic braking system having means responsive to a rise in the pressure produced by the brake applying device above a predetermined maximum value to bypass fluid under pressure from the device to a reservoir.

The foregoing as well as other objects will be made more apparent as this description proceeds, especially when considered in connection with the accompanying drawings, wherein:

Figure 4 is an enlarged sectional view through the valve mechanism shown in Figure 3;

Figure 5 is a sectional view through another modified form of pressure limiting valve.

Figure 2:
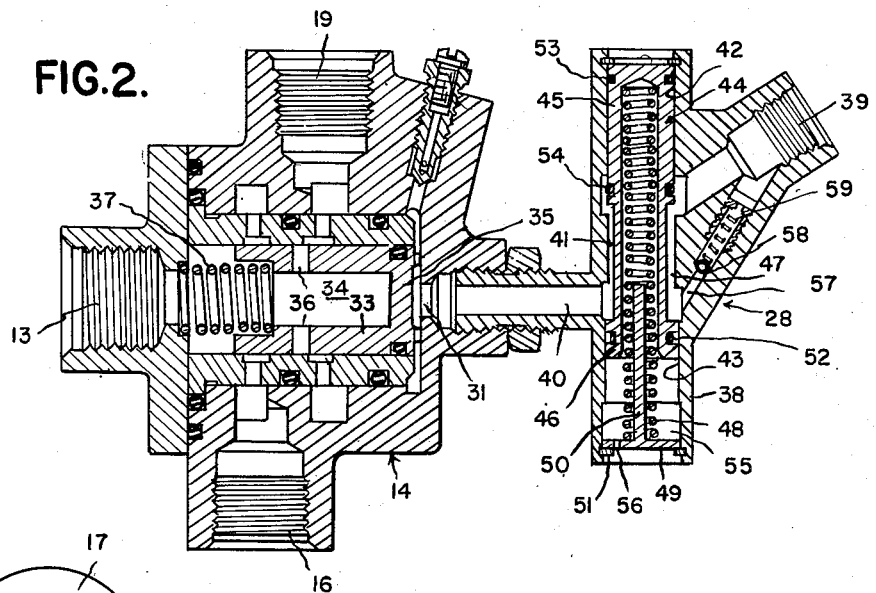
Figure 2 is an enlarged section view through the power valve and pressure limiting valve forming the subject matter of this invention.
Figure 1:
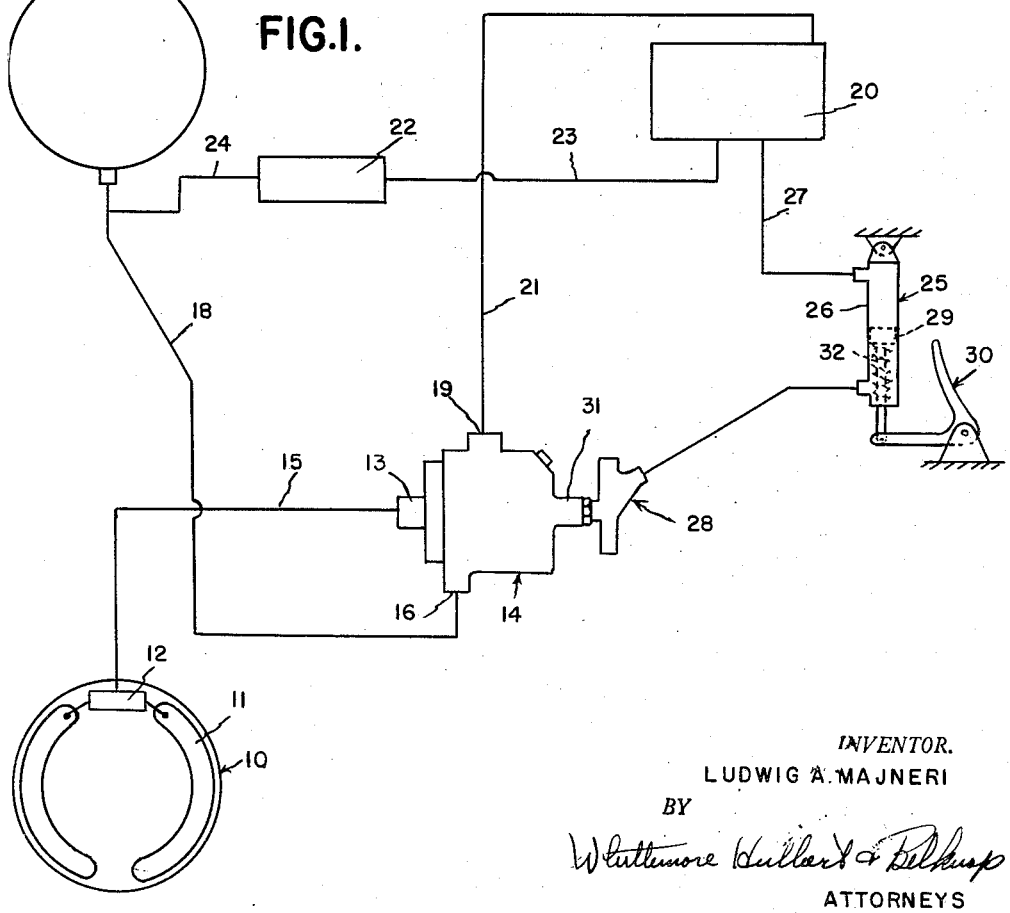
Figure 1 is a diagrammatic view of a part of a hydraulic braking system embodying the present invention.

Referring first to the embodiment of the invention shown in Figures 1 and 2, it will be noted that the reference character 10 indicates a brake of conventional design having brake friction means 11 and having a hydraulic actuator 12 supported between adjacent ends of the brake friction means for moving the latter outwardly into engagement with a suitable braking surface to apply the brake 10. The hydraulic actuator 12 is connected to the outlet port 13 of a suitable power valve 14 by means of a conduit 15 and the inlet port 16 of the valve 14 is connected to an accumulator 17 by a conduit 18. In addition the power valve 14 is provided with a second outlet port 19 which is shown in Figure 1 as connected to a reservoir 20 by a conduit 21. The accumulator is supplied with hydraulic braking fluid under relatively high pressure by a pump 22 having the intake side connected to the reservoir by a conduit 23 and having the discharge side connected to the accumulator 17 by a conduit 24.

As will be more fully hereinafter described, the power valve 14 is operated to connect the accumulator 17 to the hydraulic brake actuator 12 by means of a pressure producing device 25. The pressure producing device 25 may be in the form of a conventional master cylinder having a cylinder 26 communicating at its upper end with the reservoir 20 through the medium of a conduit 27 and having the lower end connected to the power valve 14 through the medium of a pressure limiting valve 28. A piston 29 is supported in the cylinder 26 for reciprocation and is connected to a manually operable control pedal 30.

With the arrangement thus far described, it will be noted that downward movement of the piston 29 in the cylinder 26 by the control pedal 30 supplies fluid under pressure through the valve 28 to the inlet port 31 in the power valve 13. As a result, the power valve is operated to connect the accumulator 17 to the brake actuator 12 and the brake 10 is applied. On the other hand when the control pedal 30 is released, the piston 29 in the master cylinder is moved upwardly by a spring 32 and the pressure in the power valve 14 is reduced. As will be presently described, reduction in pressure in the power valve 14 at the inlet port 31 operates the valve to close communication between the hydraulic actuator 12 and the accumulator 17 and to connect the hydraulic actuator to the reservoir 20.

The power valve 14 also operates as a limiting valve to regulate the fluid under pressure flowing from the accumulator to the hydraulic brake actuator 12. The manner in which the power valve 14 operates to perform the above result will be more fully understood upon reference to Figure 2 of the drawings. As shown in this figure, a valve member 33 is supported in the power valve for movement in opposite directions and is provided with a chamber 34 which is arranged in constant communication with the outlet port 13. The opposite end of the chamber 34 is closed by the partition or head 35 on the valve which is positioned directly opposite the inlet port 31 for engagement by fluid under pressure from the master cylinder 25.

It will also be noted that the valve chamber 34 is provided with radial ports 36 intermediate the ends. The radial ports 36 alternatively register with the inlet port 16 and the outlet port 19 as the valve member 33 moves in opposite directions. When the valve member 33 is in the position shown in Figure 2 the ports 36 register with the outlet port 19 so that the brake actuator 12 is connected to the reservoir 20. However when the master cylinder 25 is operated to supply fluid under pressure to the valve 14 through the inlet port 31, the valve member 33 is moved against the action of the spring 37 into engagement with the cap or end wall of the power valve containing the outlet port 13. When in this position the ports 36 in the valve member 33 register with the inlet port 16, and fluid from the accumulator 17 is permitted to flow through the valve to the brake actuator. The fluid under pressure flowing through the power valve 14 to the brake actuator also acts on the inner surface of the head 35 on the valve member tending to move the valve member to the position thereof shown in Figure 2 of the drawings. In this connection it is pointed out that when the valve member 33 is in a position wherein the ports 36 register with the port 16, the left hand end (Figure 2) of the valve member abuts the closure at the adjacent end of the valve casing. Thus the fluid under pressure entering the ports 36 from the accumulator 17 acts on the inner face of the head 35 which has an area substantially less than the outer surface of the head 35 exposed to the fluid under pressure from the master cylinder 25. As a result the valve member 33 is held by the master cylinder pressure in a position wherein the ports 36 register with the port 16 until the pressure acting on the inner face of the valve member plus the force applied by the spring exceeds the force exerted on the outer face of the head 35 by the master cylinder pressure. When this condition takes place, the valve member 33 is moved to the position shown in Figure 2, wherein the port 16 is closed; and the ports 36 register with the reservoir port 19. When the valve member 33 is moved to the right (Figure 2), the fluid in the valve chamber at the outer side of the valve member 33 is displaced into the pressure relief valve 28 and/or the master cylinder 26 below the piston 29, as will be more fully hereinafter described. If the pressure of this fluid continues to rise, the ports 36 register with the outlet port 19 to enable fluid under pressure to escape to the reservoir 20. It will also be understood that when the pressure at the outlet port 13 drops below the desired brake applying pressure, the valve member 33 again moves toward the outlet port to a position wherein the reservoir port 19 is closed, and the accumulator port 16 is opened.

The pressure limiting valve 28 operates to close the inlet port 31 in the power valve 14 when the pressure produced by the master cylinder 25 exceeds a predetermined maximum value. Referring again to Figure 2 of the drawings, it will be noted that the valve 28 comprises a casing 38 having an inlet port 39 connected to the lower end of the master cylinder 25 and having an outlet port 40. The outlet port 40 is spaced longitudinally of the casing from the inlet port 39 and is connected to the inlet port 31 in the power valve 14.

The valve casing 38 is formed with a cylindrical chamber 41 having a reduced portion 42 communicating with the inlet port 39 and having an enlarged portion 43 communicating with the outlet port 40. A valve member 44 is supported in the chamber 41 for movement in opposite directions. As shown in Figure 2 the valve member 44 has a reduced upper end portion 45 which slideably engages the reduced portion 42 of the chamber 41 and is provided with a head 46 at the lower end which slideably engages the enlarged portion 43 of the chamber. Also a portion of the valve member 44 between the head 46 and the reduced end 45 is reduced in diameter sufficiently to form an annular passage 47 around the valve member.

The valve member 44 is normally urged to its uppermost position by means of a spring 48 having the upper end engaging the valve and having the lower end engaging an abutment 49 which also forms a closure for the lower end of the chamber 41. In addition, the abutment 49 has an upwardly projecting cylindrical part 50 which telescopes within the spring 48 and serves as a support for the latter. Suitable snap rings 51 are respectively provided at opposite ends of the chamber 41 to limit the upward movement of the valve member 44 in the chamber 41 and to position the abutment 49 in the chamber.

The normal position of the valve member 44 in the chamber 41 is shown in Figure 2 wherein it will be noted that the passage 47 establishes communication between the inlet port 39 and the outlet port 40. In this position of the valve member, the head 46 at the lower end of the valve member assumes a position in the enlarged portion 43 of the chamber immediately below the outlet port 40 and the lower end of the reduced portion 45 terminates opposite the inlet port 39. Thus in the normal position of the valve shown in Figure 2 fluid under pressure from the master cylinder 25 is permitted to flow through the valve 28 into the power valve 14 to operate the latter in the same manner previously described. In this connection attention is called to the fact that the head 46 at the lower end of the valve member is provided with an O-ring seal 52 which engages the wall of the enlarged portion 43 of the chamber to prevent the escape of fluid under pressure past the head 46. A similar seal 53 is carried by the upper end of the valve member 44 for engagement with the wall of the reduced portion 42 of the chamber 41 to prevent the escape of fluid under pressure past the upper end of the valve.

Assuming now that for some reason the pressure produced by the master cylinder 25 exceeds a predetermined maximum value, it will be noted that as this pressure builds up in the annular passage 47, it acts on the head 46 to move the valve member downwardly in the chamber 41. As the valve member is moved downwardly against the action of the spring 48, the inlet port 39 is closed by the reduced portion 45 of the valve member and an O-ring seal 54 at the lower end of the reduced port 45 assumes a position below the inlet port 39 to seal this port from the outlet port 40. Thus the valve 28 becomes a balance valve and continued flow of fluid under pressure to the power valve 14 is prevented. However, the brake 10 is maintained in applied position even though the valve 28 is operated to close the inlet port 39, because any drop in pressure at the inlet port 31 of the power valve effects a corresponding drop in pressure in the annular passage 47 and permits the spring 48 to move valve member 44 upwardly sufficiently to open the inlet port 39. This action enables replenishing the fluid under pressure in the power valve and as soon as this pressure reaches the desired value, the valve member 44 again moves downwardly to close the port 39. This operation continues as long as the pressure produced by the master cylinder exceeds the predetermined maximum value.

Referring again to Figure 2 of the drawings, it will be noted that the lower end of the chamber 41 is provided with a further enlargement 55 adjacent the abutment 49 for receiving the head 46 on the valve member 41 when the pressure in the passage 47 becomes abnormally high. The diameter of the enlargement 55 is substantially greater than the head 46 to permit the escape of fluid around the head, and the abutment 49 is formed with a relief port 56 through which the fluid may escape.

In order to enable restoring the parts to their normal position upon release of the master cylinder 25, a passage 57 is formed in the valve casing and extends between the inlet port 39 and the outlet port 40 to enable by-passing fluid from the latter to the former. The by-pass 57 is normally closed by a ball valve 58 normally held against its seat by a spring 59. The arrangement is such that when the pressure drops at the inlet port 39 due to releasing the master cylinder, the valve 58 is opened by the fluid under pressure in the power valve 14 and this fluid is permitted to return to the master cylinder 25 in the usual manner. It will, of course, be noted that a drop in pressure at the inlet port 31 of the power valve effects a corresponding drop in pressure in the annular passage 47 and as a result the spring 48 returns the valve member 44 to its normal position shown in Figure 2.

As briefly stated above when the valve member 33 is moved to the right (Figure 2), the fluid in advance of the head 35 is displaced into the pressure relief valve 28. Assuming that the valve 28 is in the position shown in Figure 2, fluid displaced through the passage 40 by the valve member 33 acts on the head 46 and the valve 58. Thus the head 46 moves downwardly to increase the effective volume of the passage 47 and the valve 58 may open, permitting displaced fluid to flow back to the master cylinder 26 beneath the piston 29. In the event fluid displaced by the valve member is returned to the master cylinder, the piston 29 is raised in the master cylinder 25 against the manually exerted pressure applied to the foot pedal 30 by the operator.

Figure 3:
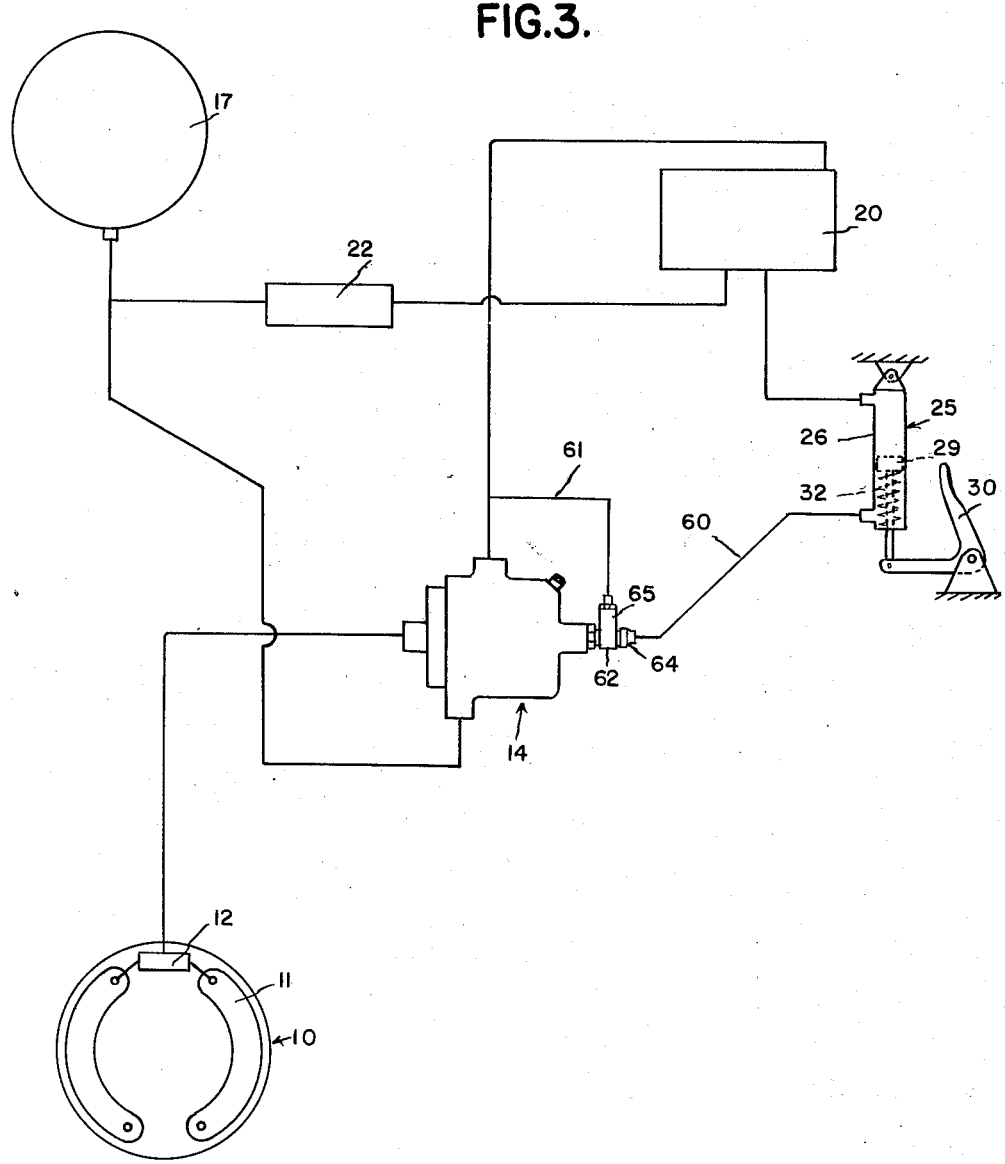
Figure 3 is a view similar to Figure 1 showing a modified form of the invention.

Referring to the embodiment of the invention shown in Figures 3 and 4, it will be noted that this construction differs principally from the one previously described in that the supply line 60 extending from the lower end of the master cylinder 25 to the power valve 14 is provided with a by-pass 61 which communicates with the reservoir 20. Upon reference to Figure 4, it will be noted that a T-fitting 62 is provided between the power valve 14 and master cylinder 25. One branch 63 of the fitting is secured in inlet port 31 of the power valve and the opposite branch 64 is connected to the supply conduit 60. The intermediate branch 65 of the fitting is connected to the by-pass 61 and is provided with a valve seat 66. A ball valve 67 is urged into engagement with the seat by a suitable spring 68 which is calibrated to maintain the valve 67 closed during normal operation of the braking system. However, if for some reason, the pressure produced by the master cylinder exceeds a predetermined maximum value, the ball valve 67 is opened to permit fluid under pressure to escape or return to the reservoir before it reaches the power valve 14. It will also be understood that the by-pass 61 is opened by fluid displaced as a result of movement of the valve member to its right hand position (Figure 4) and enables returning the displaced fluid to the reservoir.

With the above exception the braking system is the same as the one previously described and accordingly corresponding parts are indicated by the same reference characters.

Referring now to Figure 5, it will be noted that this embodiment features a pressure limiting valve 70 having a casing 71 provided with a cylindrical chamber 72 having an inlet port 73 at the upper end connected to the master cylinder 25 and having an outlet port 74 intermediate the ends connected to the inlet port 31 of the power valve 14.

A valve member 75 is supported in the chamber 72 for movement in opposite directions. The valve member is provided with a head 76 at the upper end and is formed with a frustro-conical shoulder 77 at the lower end of the head for engagement with an annular seat 78 in the chamber 72. The head 76 is further provided with an axial bore 79 which is arranged in constant communication with the master cylinder and is connected to the interior of the chamber 72 by radial ports 80.

When the valve member 75 is in its uppermost position shown in Figure 5, communication is established between the master cylinder 25 and the power valve 14 through the inlet port 74. The valve is maintained in the above position by means of a spring 81 which is calibrated to hold the valve member 75 open under normal operating conditions. However, if for some reason the pressure produced by the master cylinder exceeds a predetermined maximum value, the valve member 75 is moved downwardly against the action of the spring 81 to engage the surface 77 with the valve seat 78 and thereby close the inlet port 74. In this construction the valve 70 remains closed until the master cylinder is released sufficiently to reduce the pressure below the predetermined maximum value previously mentioned. In this embodiment of the invention, fluid displaced by movement of the valve member 33 toward the passages 74 flows through the valve 70 to the bottom of the master cylinder, and raises the piston in the master cylinder against the pressure applied to the control pedal 30 by the operator.

What I claim as my invention is:

1. Hydraulic operating mechanism comprising a source of fluid under pressure, an actuator operated by fluid under pressure, a power valve between the actuator and source of fluid under pressure, a pressure producing device for operating the power valve to connect the actuator to the source of fluid under pressure, and pressure responsive means between the pressure producing device and power valve for closing communication between said device and valve upon an increase in pressure at the delivery side of the device above a predetermined value.

2. Hydraulic operating mechanism comprising a source of fluid under pressure, an actuator operated by fluid under pressure, a power valve between the actuator and source of fluid under pressure, a pressure producing device for operating the power valve to connect the actuator to the source of fluid under pressure, and a pressure limiting valve between the power valve and pressure producing device, said pressure limiting valve having means responsive to a pressure above a predetermined maximum value produced by the device to close communication to the power valve and responsive to a drop in pressure at the power valve side of the pressure limiting valve below a predetermined minimum value to open communication between said device and power valve.

3. Hydraulic operating mechanism comprising a source of hydraulic fluid under pressure, an actuator operated by fluid under pressure, a reservoir for the hydraulic fluid, a power valve for controlling the flow of fluid under pressure from the source to the actuator and responsive to variations in pressure of the fluid at the actuator below a predetermined minimum value and above a predetermined maximum value to alternatively connect the actuator to the source of fluid under pressure and to the reservoir, a manually operable pressure producing device for operating the power valve to connect the actuator to said source of fluid supply, and a pressure limiting valve between the pressure producing device and power valve responsive to a predetermined rise in pressure of the fluid supplied to the power valve by the pressure producing device to close communication between the pressure producing device and power valve.

4. Hydraulic operating mechanism comprising a source of hydraulic fluid under pressure, an actuator operated by fluid under pressure, a reservoir for the hydraulic fluid, a power valve for controlling the flow of fluid under pressure from the source to the actuator and responsive to variations in pressure of the fluid at the actuator below a predetermined minimum value and above a predetermined maximum value to alternatively connect the actuator to the source of fluid under pressure and to the reservoir, a manually operable pressure producing device for operating the power valve to connect the actuator to said source of fluid supply, and a pressure limiting valve between said device and power valve, said pressure limiting valve having means responsive to a pressure above a predetermined maximum value produced by the device to close communication to the power valve and responsive to a drop in pressure at the power valve side of the pressure limiting valve below a predetermined minimum value to open communication between said device and power valve.

5. Hydraulic operating mechanism comprising a source of fluid under pressure, an actuator operated by fluid under pressure, a power valve between the actuator and source of fluid under pressure, a pressure producing device for operating the power valve to connect the actuator to the source of fluid under pressure, and pressure limiting means between the power valve and pressure producing device, said pressure limiting means comprising a valve having a member movable in one direction in response to a pressure at the discharge side of said device above a predetermined maximum value to close communication to the power valve and movable in the opposite direction in response to a drop in the pressure at the power valve side of the limiting valve below a predetermined minimum value to open communication between said device and power valve.

6. Hydraulic operating mechanism comprising a source of hydraulic fluid under pressure, an actuator operated by fluid under pressure, a reservoir for the hydraulic fluid, a power valve for controlling the flow of fluid under pressure from the source to the actuator and responsive to variations in pressure of the fluid at the actuator below a predetermined minimum value and above a predetermined maximum value to alternatively connect the actuator to the source of fluid under pressure and to the reservoir, a manually operable pressure producing device for operating the power valve to connect the actuator to said source of fluid supply, and pressure limiting means between the device and power valve, including a valve responsive to a pressure at the discharge side of said device above a predetermined maximum value to close communication to the power valve, said pressure limiting valve being balanced in its closed position and operable to re-establish communication between said device and power valve in response to a drop in the pressure at the power valve side of the pressure limiting valve below a predetermined minimum value.

7. Hydraulic operating mechanism comprising a source of fluid under pressure, an actuator operated by fluid under pressure, a power valve between the actuator and source of fluid under pressure, a pressure producing device for operating the power valve to connect the actuator to the source of fluid under pressure, a pressure limiting valve between the pressure producing device and power valve for closing communication between said device and valve upon an increase in pressure at the delivery side of the device above a predetermined value, means for by-passing the pressure limiting valve including a passage connecting the intake side of the power valve to the discharge side of the pressure producing device and normally closed by a valve member movable to its open position in response to a substantial drop in pressure at the discharge side of the device below the pressure at the intake side of the power valve.

8. Hydraulic operating mechanism comprising a source of fluid under pressure, an actuator operated by fluid under pressure, a power valve between the actuator and source of fluid under pressure, a pressure producing device for operating the power valve to connect the actuator to the source of fluid under pressure, pressure limiting means between the power valve and pressure producing device, said pressure limiting means comprising a valve having a member movable in one direction in response to a pressure at the discharge side of said device above a predetermined maximum value to close communication to the power valve and movable in the opposite direction in response to a drop in the pressure at the power valve side of the limiting valve below a predetermined minimum value to open communication between said device and power valve, means for by-passing the pressure limiting valve including a passage connecting the intake side of the power valve to the discharge side of the pressure producing device and normally closed by a valve member movable to its open position in response to a substantial drop in pressure at the discharge side of the device below the pressure at the intake side of the power valve.

LUDWIG A. MAJNERI.

REFERENCES CITED

The following references are of record in the file of this patent:

UNITED STATES PATENTS

| Number | Name | Date |
|---|---|---|
| 1,962,857 | Cash | June 12, 1934 |
| 2,009,515 | Pardee | July 30, 1935 |
| 2,045,445 | Davis | June 23, 1936 |
| 2,170,086 | McCune | Aug. 22, 1939 |
| 2,313,991 | Fitch | Mar. 16, 1943 |